(12) United States Patent
Fern et al.

(10) Patent No.: US 8,381,819 B2
(45) Date of Patent: Feb. 26, 2013

(54) ROTATION MECHANISM

(75) Inventors: Robert Fern, Yorkshire (GB); Ted Thornburrow, Yorkshire (GB)

(73) Assignee: Cameron International Corporation, Houston, TX (US)

( * ) Notice: Subject to any disclaimer, the term of this patent is extended or adjusted under 35 U.S.C. 154(b) by 62 days.

(21) Appl. No.: 12/738,519

(22) PCT Filed: Oct. 13, 2008

(86) PCT No.: PCT/EP2008/063694
§ 371 (c)(1),
(2), (4) Date: Jun. 11, 2010

(87) PCT Pub. No.: WO2009/053263
PCT Pub. Date: Apr. 30, 2009

(65) Prior Publication Data
US 2010/0243261 A1  Sep. 30, 2010

(30) Foreign Application Priority Data
Oct. 24, 2007  (EP) .................................... 07119220

(51) Int. Cl.
*E21B 19/00* (2006.01)
*E21B 23/00* (2006.01)

(52) U.S. Cl. ........ 166/345; 166/339; 166/351; 166/368; 166/78.1; 74/425

(58) Field of Classification Search .................. 166/345, 166/338–341, 343, 348, 351, 352, 367, 368, 166/378–381, 85.1, 78.1; 285/38, 39; 74/10.85, 74/425; 254/220, 229, 296, 343
See application file for complete search history.

(56) References Cited

U.S. PATENT DOCUMENTS

| | | | | |
|---|---|---|---|---|
| 1,072,282 A | * | 9/1913 | Waninger | 74/396 |
| 2,368,332 A | * | 1/1945 | Shaffer | 277/327 |
| 2,471,198 A | * | 5/1949 | Cormany | 166/78.1 |
| 2,542,388 A | * | 2/1951 | Brodhead | 74/500 |
| 2,595,434 A | * | 5/1952 | Williams | 166/78.1 |
| 2,693,238 A | * | 11/1954 | Baker | 166/78.1 |
| 3,239,246 A | * | 3/1966 | Barber | 285/23 |
| 3,811,335 A | * | 5/1974 | Hunsberger | 74/409 |

(Continued)

FOREIGN PATENT DOCUMENTS

| | | |
|---|---|---|
| GB | 6288 | 0/1912 |
| GB | 106900 | 6/1917 |

(Continued)

OTHER PUBLICATIONS

PCT/EP2008/063694 International Search Report and Written Opinion, Mar. 20, 2009.

*Primary Examiner* — Thomas Beach
(74) *Attorney, Agent, or Firm* — Chamberlain Hrdlicka

(57) ABSTRACT

A system for rotating an element inside a pressure containing housing. In some embodiments, the mechanism includes a pressure containing housing having an opening through a wall of the housing into an internal chamber in which, in use, the element to be rotated is located, a bushing located within the opening, and a worm gear rotatably mounted in the bushing. The worm gear is offset from the axial center of the bushing such that rotation of the bushing moves the worm gear between an extended position, wherein the thread of the worm gear engages an element in the chamber, and a retracted position, wherein the thread is disengaged from the element in the chamber.

8 Claims, 5 Drawing Sheets

U.S. PATENT DOCUMENTS

| | | | | |
|---|---|---|---|---|
| 4,511,128 | A * | 4/1985 | Dancsik | 269/61 |
| 4,616,803 | A * | 10/1986 | Schils | 251/14 |
| 4,630,688 | A * | 12/1986 | True et al. | 173/221 |
| 5,383,519 | A * | 1/1995 | Wright et al. | 166/78.1 |
| 5,427,178 | A * | 6/1995 | Bland | 166/78.1 |
| 5,429,188 | A * | 7/1995 | Cameron et al. | 166/78.1 |
| 5,477,752 | A * | 12/1995 | West et al. | 74/625 |
| 5,875,841 | A * | 3/1999 | Wright et al. | 166/85.4 |
| 5,964,286 | A * | 10/1999 | Cuppen | 166/78.1 |
| 6,026,898 | A * | 2/2000 | Bland et al. | 166/78.1 |
| 6,199,630 | B1 * | 3/2001 | Blundell et al. | 166/78.1 |
| 6,269,709 | B1 * | 8/2001 | Sangret | 74/398 |
| 6,543,533 | B2 * | 4/2003 | Meek et al. | 166/78.1 |
| 6,640,892 | B1 * | 11/2003 | Wright | 166/78.1 |
| 6,834,717 | B2 * | 12/2004 | Bland | 166/78.1 |
| 7,770,649 | B2 * | 8/2010 | Biester et al. | 166/338 |
| 2002/0121367 | A1 * | 9/2002 | Meek et al. | 166/78.1 |
| 2003/0024709 | A1 * | 2/2003 | Cuppen | 166/382 |
| 2006/0225890 | A1 * | 10/2006 | Ray | 166/382 |

FOREIGN PATENT DOCUMENTS

| | | |
|---|---|---|
| GB | 570600 | 7/1945 |
| PL | 164102 B1 | 6/1994 |
| SU | 1373930 A1 | 2/1988 |

* cited by examiner

ROTATION MECHANISM

CROSS-REFERENCE TO RELATED APPLICATIONS

This application claims benefit of PCT Application No. PCT/EP2008/063694 filed Oct. 13, 2008, and entitled "Rotation Mechanism," which is hereby incorporated herein by reference in its entirety for all purposes.

STATEMENT REGARDING FEDERALLY SPONSORED RESEARCH OR DEVELOPMENT

Not applicable.

BACKGROUND

This invention relates to a rotation mechanism and, in particular, to a rotation mechanism for use in rotating an element which is located within a pressure containing housing.

The specific application of the present invention is to a type of wellhead system known as "Tie back" which is used on wells with pre-drilled casing strings which are suspended at the seabed or mud line. Whilst specifically applicable to this type of wellhead system, the invention may be used in other applications in which rotation of an element in a pressure containing housing is required.

In order to connect pre-drilled casing strings to a wellhead at the surface, which is typically located on a production platform, a means has to be provided in the surface wellhead to place the mudline to surface (tie back) casing strings in tension.

This requires that the casing suspension mechanism (hanger) within the wellhead provides a means of adjustment which conventionally comprises a threaded hanger landing ring. This ring is mounted on the casing hanger and is rotated, such that it is moved axially down the body of the casing hanger whilst the hanger is held at the required tension by tubular members that pass back to the surface. The landing ring is rotated by means of an engaging tool, which is in turn rotated by tubular members passing back to the surface, these tubular members being external to and concentric with the internal tubular member which are holding the casing hanger in tension. The landing ring is rotated down the body of the casing hanger until it abuts a landing shoulder such that the applied tension on the hanger cannot be released.

However, such an arrangement introduces problems in handling, given the concentric tubular members, and increases the number of manipulations down the well (i.e. trips with a tool) which adds significant cost to the drilling operation.

Accordingly, the present invention aims to provide a system which eliminates the requirement for an external tubular member to provide the means of rotating the threaded hanger landing ring, but which still maintains the pressure integrity of the housing.

SUMMARY OF THE DISCLOSURE

According to the present invention, there is provided a system for rotating an element inside a pressure containing housing, the mechanism comprising;

a pressure containing housing having an opening through a wall of the housing into an internal chamber in which, in use, the element to be rotated is located;

a bushing located within the opening;

a worm gear rotatably mounted in the bushing, the worm gear being offset from the axial centre of the bushing such that rotation of the bushing moves the worm gear between an extended position in which the thread of the worm gear is intended to engage an element in the chamber and a retracted position in which the thread is not intended to engage an element in the chamber.

Thus, the present invention provides a simple to operate worm gear which can be moved into or out of engagement with the element which is to be rotated, such that, when in engagement, rotation of the worm gear causes rotation of the element within the pressure containing housing. Thus, the present invention allows the casing hanger to be run, tensioned and adjusted using a single trip down the drilled hole as the rotation mechanism is clearly in place, whereas previously it was necessary to have three trips, one to run a tool to tension the hanger and one to tension it and one to adjust the tension as the hanger was run and lock it in place.

Preferably, the retracted position of the worm gear allows the element within the internal chamber to be removed axially from the chamber, i.e. it does not extend into the chamber. Preferably, in the extended position, the thread on the worm gear extends into the chamber in order that it can engage with the element which is to be rotated.

The system preferably further comprises pressure containing seals between the bushing and the housing to ensure that the integrity of the pressure containing housing is maintained.

A handle is preferably provided for rotating the bushing, such that the movement of the bushing into or out of engagement with an element within the pressure containing housing can be carried out by hand. Alternatively, a motor or other suitable drive means may be provided for rotating the handle. Typically, the handle will be adjusted by hand when the wellhead is at the surface, although there may be situations in which the wellhead is located subsea, in which case a motor or other drive means will be necessary in order to rotate the bushing.

The bushing is preferably rotatable about 180°, although other suitable ranges of operation are envisaged.

A drive means is preferably provided for rotating the worm gear and this drive means may include a handle for manual operation or, alternatively, may include a motor for rotating the worm gear.

The worm gear is preferably substantially tangential to the chamber.

BRIEF DESCRIPTION OF THE DRAWINGS

One example of the present invention will now be described with reference to the accompanying drawings, in which.

DETAILED DESCRIPTION OF THE DISCLOSED EMBODIMENTS

Figure 1:
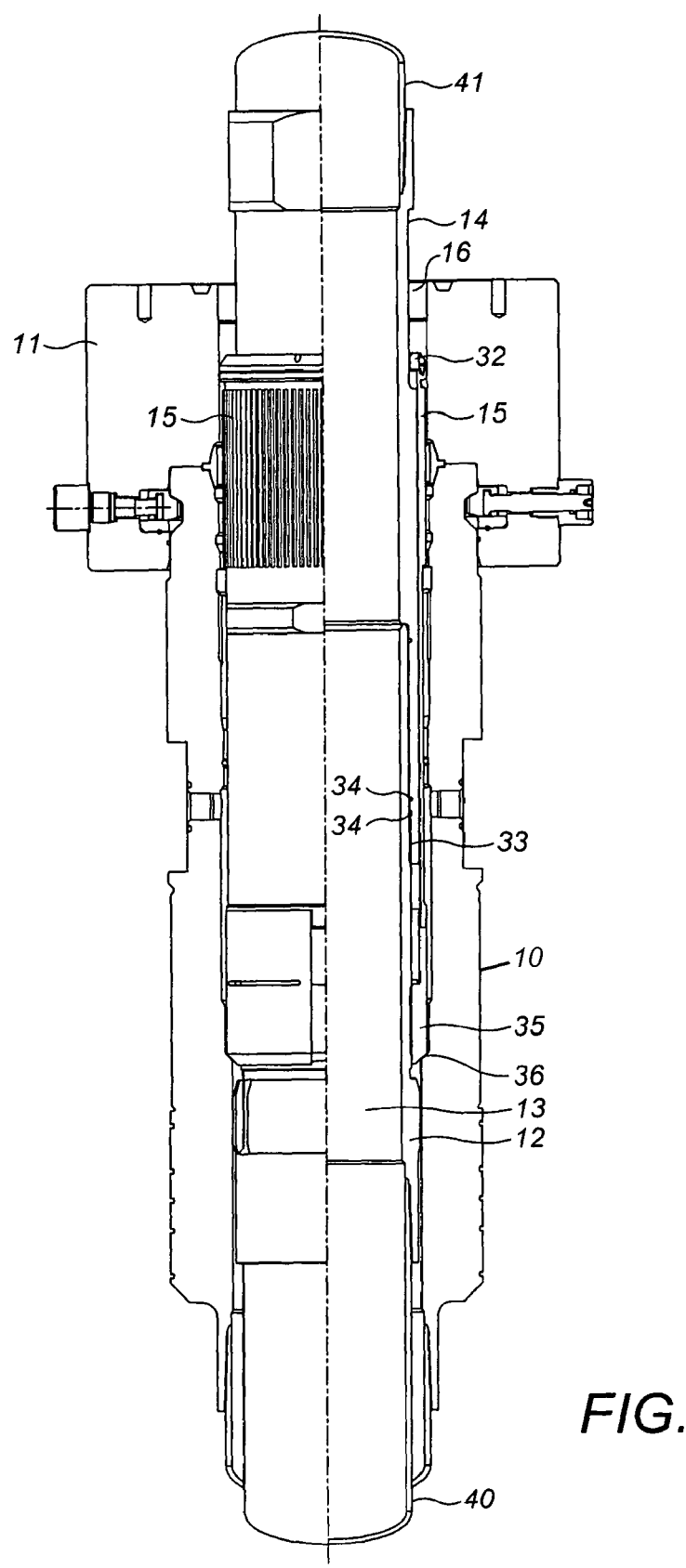
FIG. 1 shows a sectional view of a running tool with an adjustment sleeve in place.

FIG. 1 shows a wellhead housing 10 which is connected to the drilling system, typically comprising the blow out preventors (not shown), by means of a drilling adaptor 11. The drilling adaptor 11 contains the rotation mechanism of the invention which is illustrated in FIGS. 2 to 5.

A casing hanger 12 having a bore 13 therethrough is mounted on a hanger running tool 14. A drive sleeve 15 having an external thread of helical grooves or teeth 37 is mounted such that it is slidable axially and rotatable about the outer portion of the hanger running tool 14. The hanger 12 is to be located in well bore 16 and, using the present invention, tensioned and adjusted in a single trip.

Figure 2:
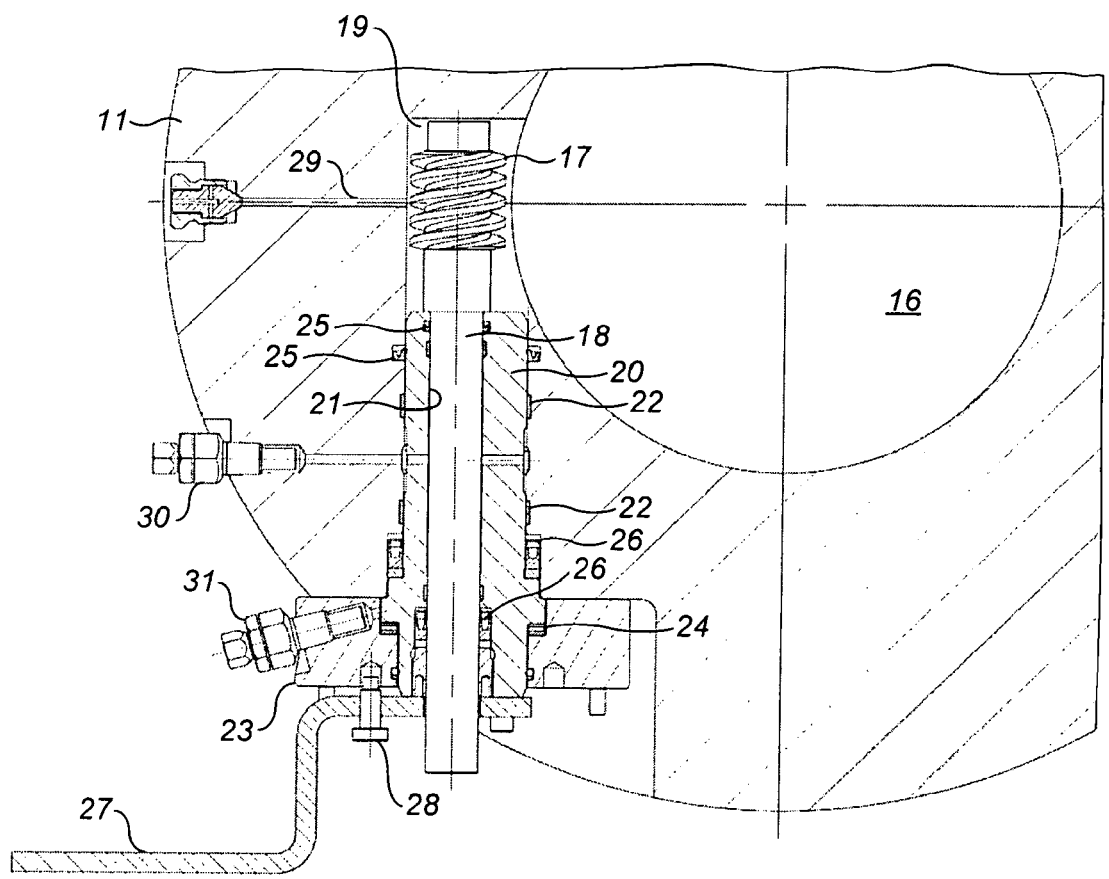
FIG. 2 is a cross-sectional view of the present invention with the worm gear retracted.

With reference now to FIGS. 2 to 5, the drilling adaptor 11 which helps to define the well bore 16 and acts as a pressure containing housing. A worm gear 17, connected to an integral shaft 18, is located within a typically tangential bore 19, the tangential bore 19 opening into the well bore 16. In FIG. 2, the worm gear 17 is shown in the retracted position in which it does not extend into well bore 16 to any extent.

The worm gear 17 and its integral shaft 18 are rotatably mounted within a bushing 20 which has an eccentric bore 21. The bushing 20 is supported by bearing rings 22 such that it is rotatable within bore 19. A flange 23 retains the bushing and thrust bearings 24 ensure the freedom of movement of the bushing when under internal pressure. Seals 25 and 26 contain pressure from within the well bore 16.

A handle 27 for rotating the bushing is provided and is clearly marked to indicate the position in which the worm gear 17 is engaged and the position in which it is disengaged from the sleeve 15. A lock pin 28 controls the 180° rotation of the bushing to engage or disengage the worm gear. Ports 29, 30 and 31 provide means for flushing and lubricating the mechanism.

In the disengaged position, the worm 17 is clear of the well bore 16 allowing full access down the well in the conventional manner.

Figure 5:
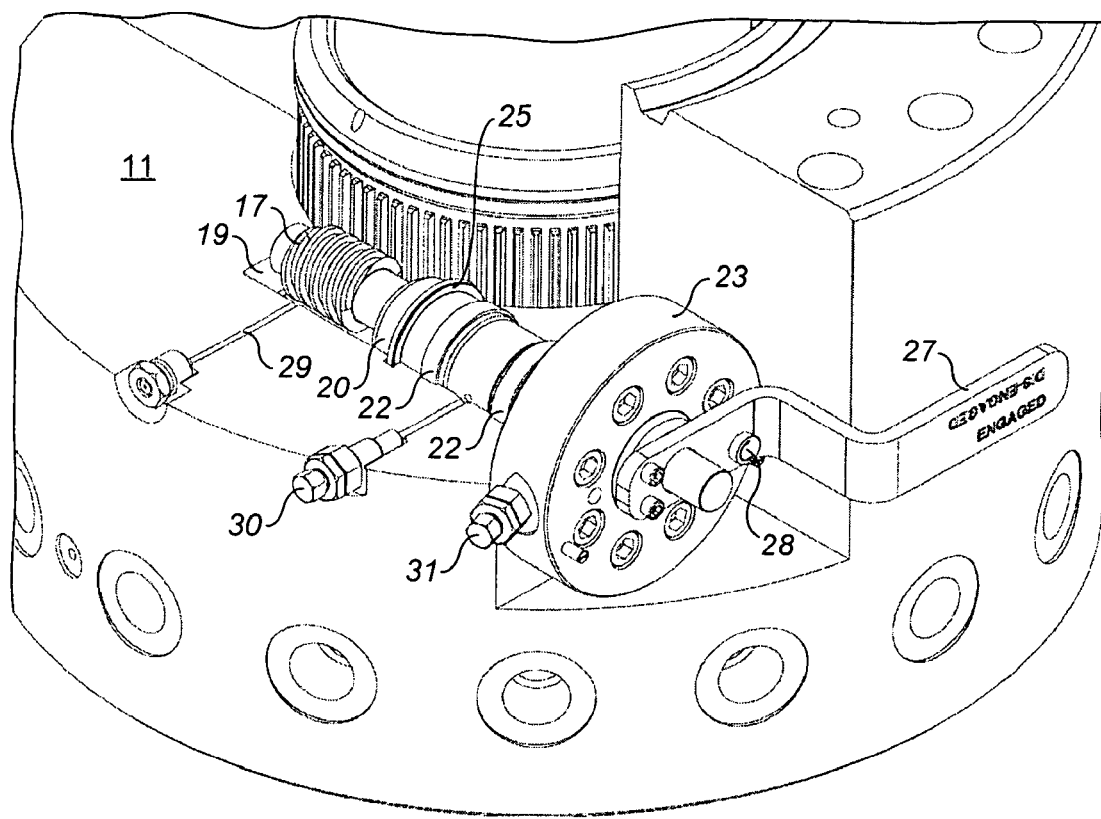
FIG. 5 shows a three D sectional view of the present invention with the worm gear engaged and a sleeve in the well bore.

In the engaged position shown in FIG. 5, the worm 17 engages with the mating profile of the helical drive gear or sleeve 15. This item is slidably mounted, both axially and rotationally, on hanger running tool 14 and it secured by a retaining ring 32. The hanger running tool 14 is connected to the hanger 12 by means of a thread 33 and pressure seals 34. A hanger adjustable landing ring 35 is threaded to the lower part of the hanger running tool, with the adjustable landing ring 35 being fluted and slotted to allow the flow of drilling fluids to pass the landing ring. Mating extensions (not shown) at the lower extremity of the helical drive gear or sleeve 15 engaged with slots (not shown) in the hanger adjustable landing ring 35.

Figure 4:
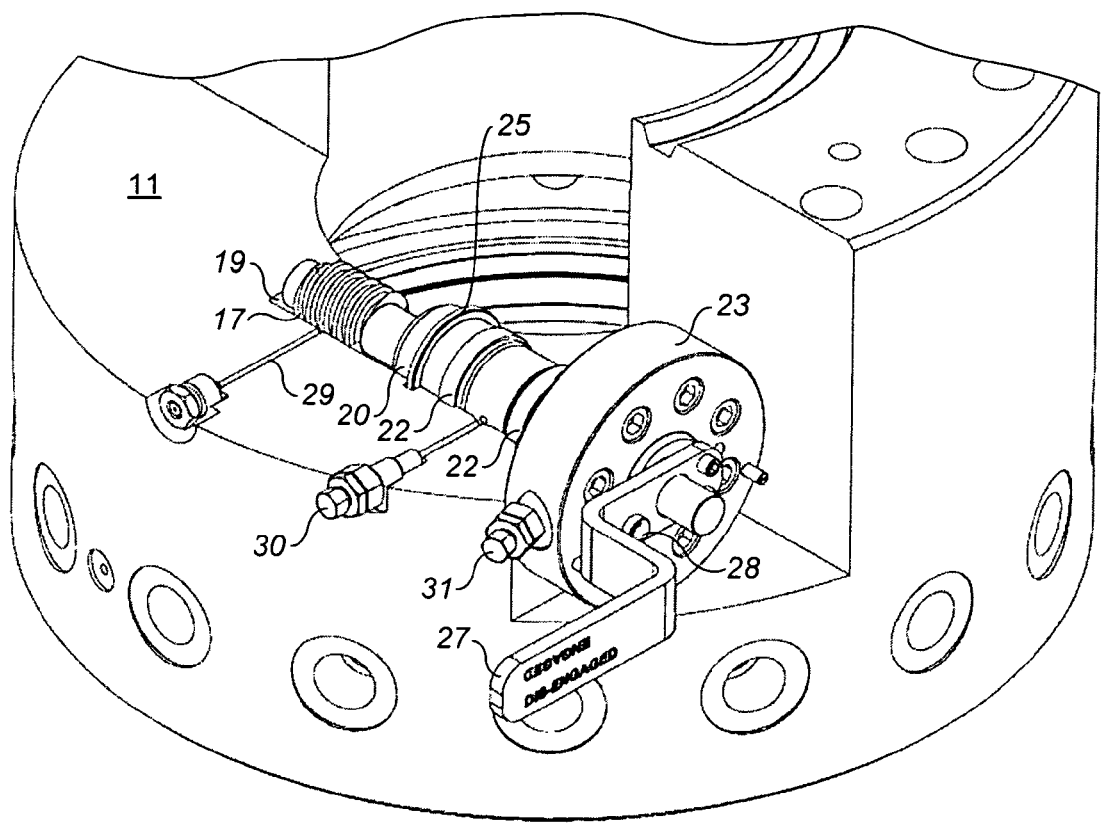
FIG. 4 shows a three dimensional, partial section view of the present invention with the worm gear disengaged.

A proposed installation procedure is as follows;

(1) The rotation mechanism, i.e. the worm gear, bushing and handle etc, is placed and locked in the retracted position as shown in FIGS. 2 and 4.

(2) The hanger 12 with the casing string 40 attached is then run into the well using hanger running tool 14 and the casing string engaged in the mud line hanger system.

(3) The required tension is then applied to the tie back string (i.e. the casing string 40) by the running tool landing string 41. At this time, the hanger adjustable landing ring 35 is clear of the landing shoulder 36 in the high-pressure housing 10.

Figure 3:
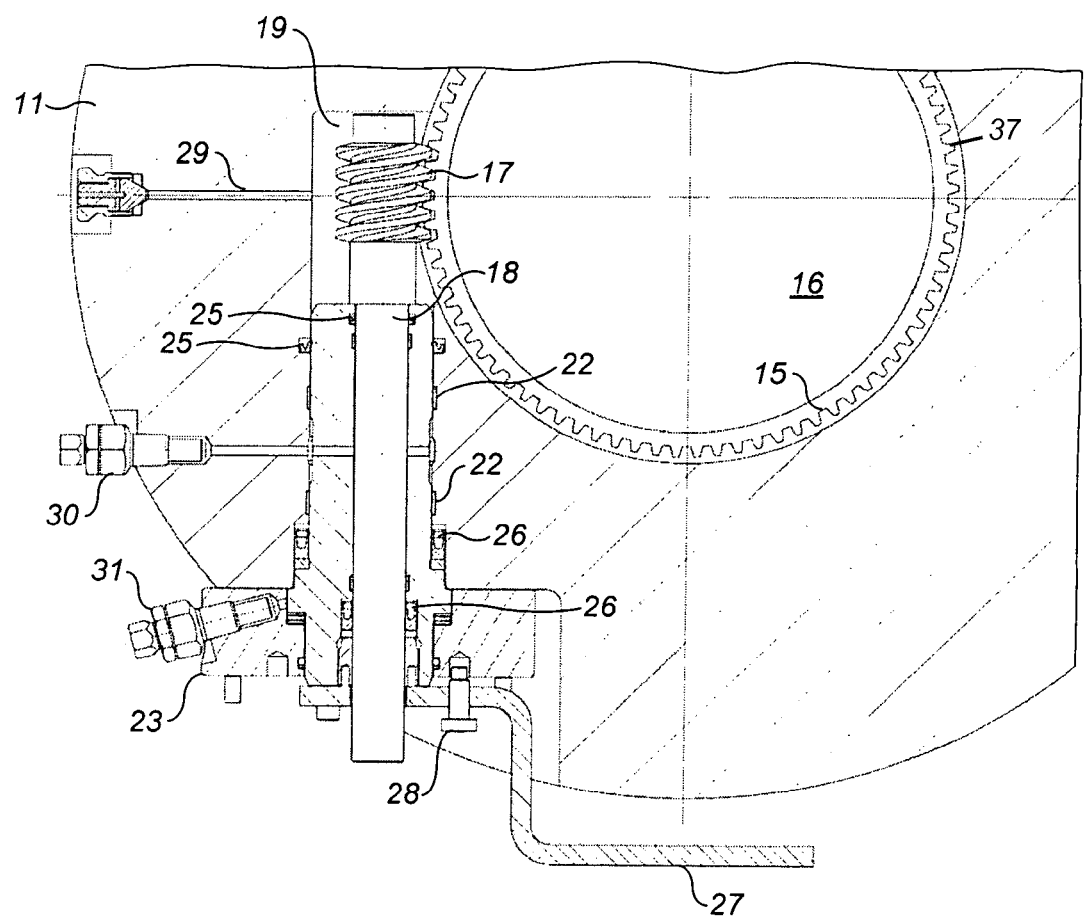
FIG. 3 is a cross-sectional view of the present invention with the worm gear engaged and a sleeve in the well bore.

(4) The worm is then engaged, by rotating the handle through 180° and locked in the engaged position in FIGS. 3 and 5. This means that the worm 17 is engaged with mating teeth 37 on the helical drive gear 15.

(5) Rotation of the worm shaft 18, either by hand or with a powered actuator, causes the worm 17 to rotate the helical drive gear 15 which in turn rotates the landing ring 35. This rotation causes the landing ring 35 to move down axially on the hanger 12, thereby pulling the helical drive gear 15 down with the ring, as the helical drive gear is free to slide both axially and rotationally around the hanger running tool 14.

(6) When increased resistance is obtained this indicates that the hanger adjustable landing ring 35 is in contact with the landing shoulder 36 in the wellhead 10. At this time, the weight on the landing string 41 is relaxed.

(7) The worm gear is then placed and locked in the retracted position shown in FIGS. 2 and 4 such that the worm 17 no longer engages with the teeth 37 on the helical drive gear. Subsequent rotation of the landing string would release the hanger running tool 14 from the hanger 12, thereby allowing retrieval of the landing string and running tool to the surface, complete with the helical drive gear.

While various embodiments have been shown and described, modifications thereof can be made by one skilled in the art without departing from the spirit and teachings herein. The embodiments herein are exemplary only, and are not limiting. Many variations and modifications of the apparatus disclosed herein are possible and within the scope of the invention. Accordingly, the scope of protection is not limited by the description set out above, but is only limited by the claims which follow, that scope including all equivalents of the subject matter of the claims.

The invention claimed is:

1. A drilling adaptor system for rotating a threaded hanger landing ring in a wellhead housing for a wellbore, the system comprising:
   a sleeve extendable into the wellhead housing and removably coupleable to the threaded hanger landing ring; and
   a drilling adaptor comprising:
      a bushing disposed in the housing;
      a shaft disposed within the bushing;
      a worm gear coupled to an end of the shaft;
      wherein the bushing is rotatable to extend the worm gear into engagement with the sleeve and to retract the worm gear from engagement with the sleeve.

2. The drilling adaptor of claim 1, further comprising a rotatable handle coupled to the shaft.

3. The drilling adaptor of claim 1, further comprising bearing rings supporting the bushing, whereby the bushing is rotatable relative to the bore.

4. The drilling adaptor of claim 3, further comprising a flange retaining the bushing and the bearing rings within the bore.

5. The drilling adaptor of claim 1, wherein the worm gear engages teeth on the sleeve when in the extended position.

6. A system disposed at a wellhead housing for a wellbore, the system comprising:
   a hanger suspendable in the wellhead housing;
   a hanger landing ring disposed about the hanger, wherein the hanger landing ring is rotatable about and axially moveable along the hanger;
   a sleeve removably coupled to the hanger landing ring, wherein rotation of the sleeve rotates the hanger landing ring, moving the hanger landing ring axially along the hanger; and
   a drilling adaptor connected to the wellhead housing, the drilling adaptor comprising a rotatable worm gear, the worm gear extendable to engage and rotate the sleeve and retractable to disengage the sleeve.

7. The system of claim 6, wherein the hanger is supported by a hanger running tool.

8. The system of claim 6, wherein the sleeve comprises teeth engaging the worm gear when extended into engagement with the sleeve.

* * * * *